Dec. 10, 1963 G. L. KITSON 3,113,663
CONVEYOR AND LOADER FOR BULK MATERIALS
Filed May 23, 1960 3 Sheets-Sheet 1
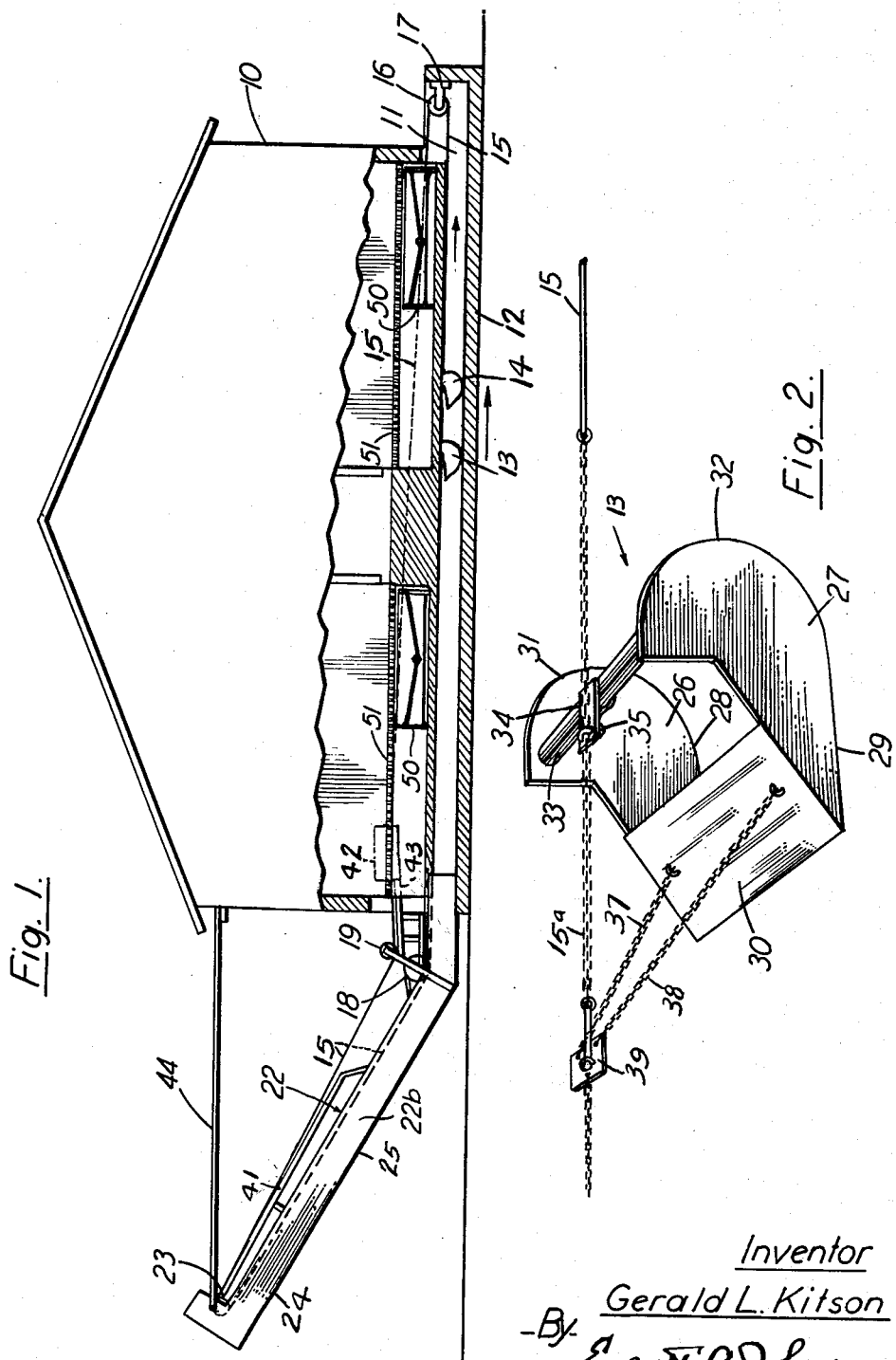
Inventor
Gerald L. Kitson
By Everett A. Johnson
Attorney

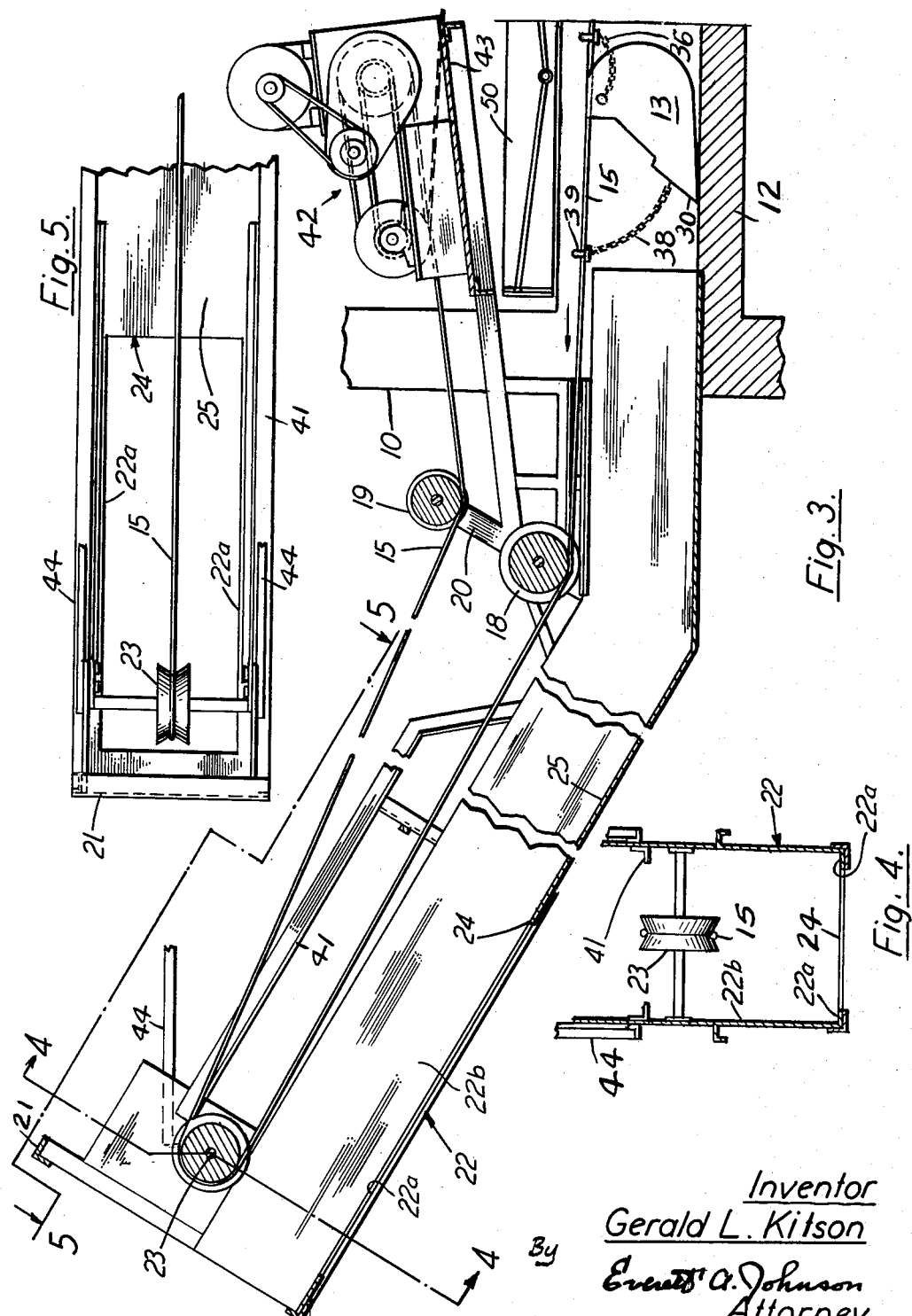

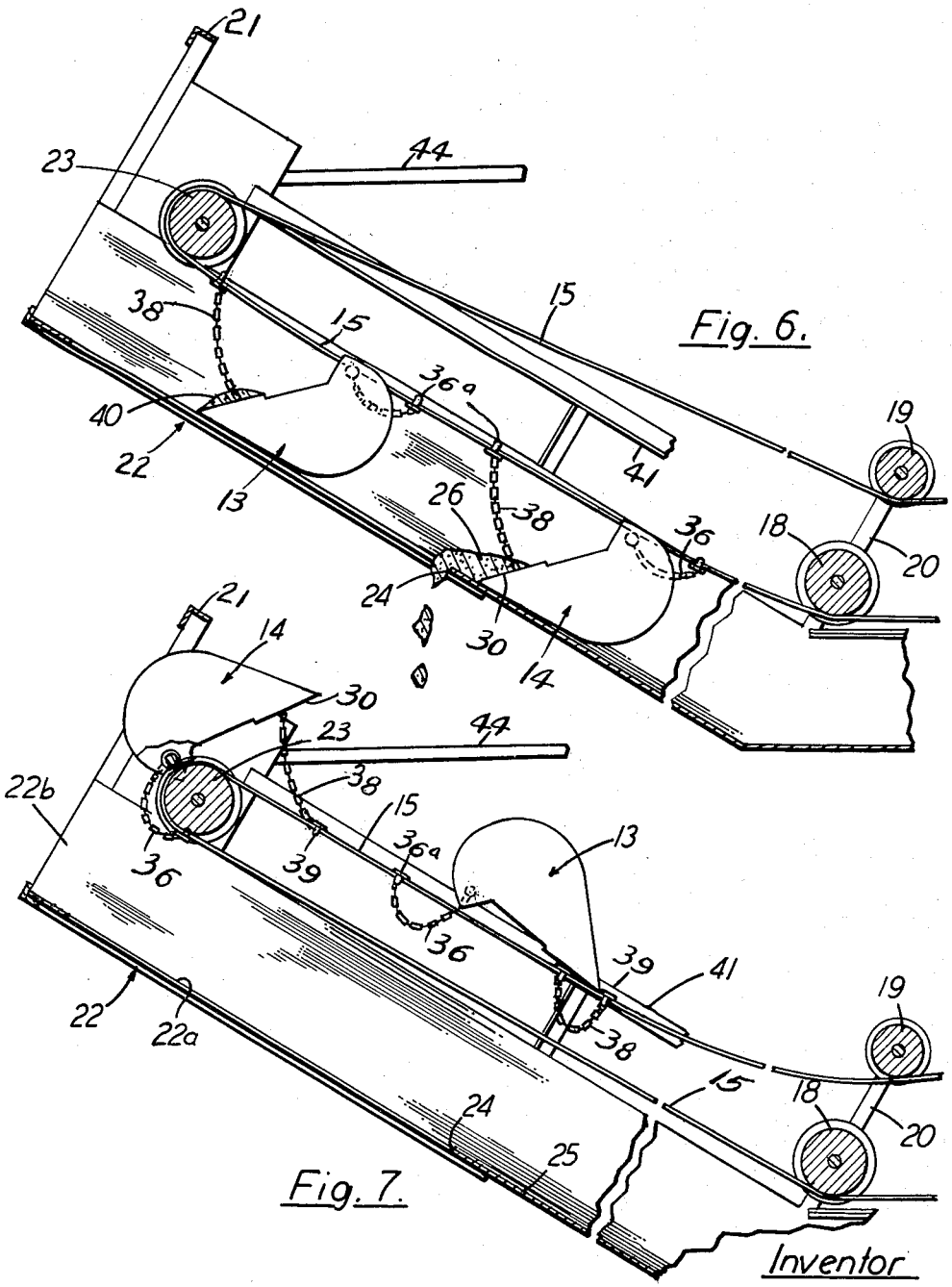

United States Patent Office 3,113,663
Patented Dec. 10, 1963

3,113,663
CONVEYOR AND LOADER FOR BULK MATERIALS
Gerald L. Kitson, 9709 Belding Road NE., Rockford, Mich.
Filed May 23, 1960, Ser. No. 31,191
4 Claims. (Cl. 198—218)

This invention relates to the construction of conveyors for handling bulk material, and has been developed primarily in conjunction with cleaning equipment for removing litter from barns and poultry houses. Equipment embodying this invention has been successfully used for collecting litter which has been deposited at several points by floor cleaning machinery, and for delivering it to a point of discharge into a vehicle. The usual floor cleaner for clearing the floor of a poultry house or barn is essentially a scraping conveyor that moves across the area where the litter is deposited. A particular path of movement is normally associated with each of the cleaner units, which results in the litter being deposited at the end of the path traversed by the cleaner unit. Several of these are normally used, and it becomes necessary to collect the material deposited at each of these points, and to transfer it to a loading station so that it can conveniently be dropped into a hauling vehicle.

In general terms, the conveyor provided by this invention includes a transfer surface which contains the points where the litter is deposited by the cleaner units. This transfer surface is preferably a straight section of floor, but also preferably includes an upwardly inclined section extending upwardly from the floor level so that the litter may be raised to a sufficient height to facilitate the loading operation. A preferably endless flexible member such as a cable is positioned by suitable pulleys with its path of movement along and directly above the transfer surface. A group of scoop units is carried by the flexible member, and the reciprocating movement thereof (which may be controlled by sequentially operated switches actuating reversible power means) causes the scoop units to traverse the transfer surface and move the litter from the collecting points along the floor area and upwardly along the inclined portion to the point of discharge.

The invention includes a novel arrangement for associating the scoop units with respect to the remaining structure of the conveyor so that a very satisfactory dumping operation is provided at the outer end of the inclined loading portion of the transverse surface. The scoop units are caused to move around the end pulley of the cable system, invert, and proceed for a distance along a return path above the normal conveying path. The movement of the scoop units around the pulley and the inverting of them resulting from a track arrangement positively assures a complete dumping. The formation of the scoops themselves is such as to induce a conveying action when moving in one direction, while providing a rocking movement on the return path which will tend to raise the conveying blade so that it will ride over and by-pass the material on the transfer surface for later engagement on the next loading movement.

The details of the invention will be analyzed further through discussion of the particular embodiments illustrated in the accompanying drawings. In the drawings:

FIGURE 1 presents a schematic illustration of an installation of a conveyor across the end of a poultry house equipped with floor cleaners;

FIGURE 2 shows a perspective view on an enlarged scale showing the relationship of one of the scoop units with the cable;

FIGURE 3 presents a sectional elevation on an enlarged scale from that of FIGURE 1, and showing the end portion of the conveyor unit at the loading station;

FIGURE 4 is a section taken on the plane 4—4 of FIGURE 3;

FIGURE 5 is the view taken on the plane 5—5 of FIGURE 3;

FIGURE 6 illustrates the position of the scoop units at the end of the loading movement where the discharge of the bulk material is beginning; and FIGURE 7 illustrates the position of the scoop units after they have passed around the end pulley, and are engaging the return track as a means of completing the dumping operation.

Referring to the drawings, FIGURE 1 illustrates a poultry house generally indicated at 10, and which is provided with a trench 11 along one end for receiving the discharge of a group of cleaners 50 used to move litter down along the length of the poultry house 10 below the slat floor 51 and into the pit 11 for transfer from the house 10 by the conveyor described herein. The bottom 12 of the trench 11 serves as the transfer surface of this invention across which the material delivered by the floor cleaners 50 is conveyed by the scoop units 13 and 14 under the action of the cable 14.

The pulley 16 is mounted on the bracket 17 secured to the end structure forming the trench 11, and the pulleys 18 and 19 are mounted on the bracket 20 secured to the frame 21 of the inclined loading portion or flight of the conveyor which is generally indicated at 22.

The outer pulley 23 is also mounted on the frame 21 on a suitable bracket, and is positioned somewhat beyond the discharge end 24 of the inclined portion 25 of the transfer surface extending upwardly from the floor 12. Material moving along the transfer surface and accumulating in front of the blades 30 is indicated in FIGURE 6, and begins to fall downward as soon as it has passed the discharge end 24 of the transfer surface or chute 22 on which it is supported. The manner in which the bulk material delivered by the floor cleaner is moved results from the formation of the scoop units 13 and 14.

Referring to FIGURE 2, each of the scoop units 13 and 14 includes a pair of side plates 26 and 27, each of which has a riding portion or runner 28 and 29, respectively. These riding portions 28 or 29 skid across the transfer surface 12 during the active movement of the scoop unit, which is in the direction of the arrow in FIGURE 2. All of the directions referred to herein are given with respect to this active direction of movement. The transverse front plate or blade 30 extends between the side plates 26 and 27, and is mounted to assume a position inclining upwardly and rearwardly with respect to the direction of conveying movement. The rear portion of the side plates is formed into an arcuate rocking portion 31 and 32; and the cross bar 33 connects the upper part of these rocking portions, and is secured to the cable 15 by a suitable clamp 34. This clamp can conveniently be formed as a strap of steel bent to a shape capable of receiving the bar 33, and having a U bolt 35 for securing the ends of the clamp 34 together and for embracing the cable 15.

The chains are secured to the cable 15 at a point ahead of the scoop units 13 and 14 with respect to the active direction of movement, and is also attached to the transverse blade 30. The chains 37 and 38 are attached to the blade 30 and also are secured to the clip 39 connected to the cable 15 ahead of the scoop units 13 or 14 as shown in FIGURE 2.

Another method of the attachment of the scoop units to the cable becomes clear from an examination of FIGURES 3, 6 and 7, which includes the chain 36 and clip 36a attached to the flexible member 15.

After each of the scoop units has travelled for some distance along the projecting scoop guide members 22a between the side walls 22b and past the end 24 of the supporting surface, there will still be a collection of material supported by the blades 30 of the scoop units 13 and 14 at the points indicated at 40 in FIGURE 6. As the movement of the cable continues, the scoop units are drawn into the position shown in FIGURE 7 by the action of the chains 37 and 38. As the scoop units swing around into the position shown in FIGURE 7, they arrive at the point where the position of the center of gravity of the scoop units result in causing them to invert (or move about the pivot connection formed by the bar 33 in the clip 34) with a jar on striking the return track section 41. This action will shake loose any material adhering to the transverse blade 30, and cause it to drop through the discharge opening beyond the end 24 of the transfer surface. The axial length of the pulley 23 is selected to provide a sufficient width of groove to provide a guide for the cable 15.

The power unit 42 includes a conventional motor coupled through suitable sprockets and sheaves for the transfer of power to the cable 15. This power transfer system is mounted on a platform structure 43 secured to the frame 21, and is fixed with respect to the structure 10 of the poultry house. Additional support for the inclined loading portion 22 of the conveyor is provided by the strut 44 extending from the outer end over to a point of attachment with the building itself.

Details of the floor cleaner which delivers material to the conveyor-elevator of FIGURES 1 and 3 are given in my co-pending application Serial No. 736,765, filed May 21, 1958, and of which this application is a continuation-in-part.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

What I claim is:

1. A towed conveyor comprising means providing a normally fixed transfer surface for supporting material to be conveyed, said transfer surface including a substantially imperforate portion extending to a place of discharge, scoop guide means projecting beyond and along said place of discharge, flexible member means stretched above said transfer surface and pulley means disposed to establish a path of movement of a portion of said flexible member means adjacent and above said transfer surface, at least one scoop unit operatively secured to said portion of said flexible member for movement along said transfer surface, over said place of discharge, and along said guide means, said scoop unit including opposite side plate members having a linear runner portion and an arcuate rear rocking portion, the ends of said arcuate portion lying in a plane which is transverse to the plane of said linear runner, a cross bar connected to said flexible member and extending between said plate members, and a transverse front transfer blade disposed at an upward-rearward incline with respect to said runner portion said blade member being on said running portion forward of said rocking portion, a slack hitch between the leading face of said blade and said flexible member towing said scoop unit by a tension hitch to said cross bar, and selectively operated power means for moving said flexible member means in and towing said scoop in alternate directions over substantially the entire length of said surface and said projecting scoop guide means.

2. A cleaner for a poultry house including a slat floor, channels below said floor, a group of reciprocating blade type scrapers in said channels, a trench at a level below said floor arranged transverse to the ends of said channels, the said group of scrapers discharging litter into said trench, a conveyor disposed in said trench including a normally fixed transfer surface, said transfer surface including a substantially horizontal portion adapted to receive material to be conveyed along substantially its entire length and an inclined elevating portion extending upwardly therefrom, flexible member means and pulley means disposed to establish a path of movement of a portion of said flexible member means adjacent and above said transfer surface, said pulley means including an end pulley mounted beyond the upper end of said inclined elevating portion, at least one scoop unit secured to said flexible member for movement along said horizontal and inclined portions, said scoop unit including a blade portion and two side plate members having a cross bar therebetween remote from said blade portion, said flexible member being fixed to said cross bar, return track means spaced above and beyond the upper discharge end of said inclined portion and extending from a point adjacent said end pulley for supporting said scoop unit above said inclined portion along a path of movement downwardly from said end pulley, and power means for moving said flexible member means and scoop unit upwardly along said transfer surface, through a point of discharge at the upper end thereof, and returning downwardly along said track means in an inverted position whereby adhering material is dislodged from said scoop unit and discharged into said elevating portion.

3. A conveyor comprising means forming a normally fixed transfer surface for supporting conveyed material, said transfer surface including a substantially horizontal portion and an upwardly inclined portion, towing means and pulley means disposed to establish a path of movement of a portion of said towing means adjacent and above said transfer surface, said pulley means including an upper end pulley mounted beyond the discharge end of said inclined portion, at least one towed scoop unit secured to said towing portion for movement along said transfer surface, means connecting said scoop unit to a fixed point on said towing portion ahead of said scoop unit, each said scoop unit comprising a transverse inclined blade, a pair of side members supporting said blade, said side members having forward runner portions and rearward rocking portions, flexible hitch means connecting each of said rocking portions to a point on said towing portion behind said scoop unit, return track means above said inclined portion and extending from a point adjacent said end pulley for supporting said scoop unit along a path of movement downwardly from said end pulley, and power means for moving said towing means in a reciprocating cyclic manner.

4. A conveyor comprising means providing a normally fixed surface for supporting conveyed material, said surface including a substantially horizontal flight and a connecting inclined flight extending upwardly therefrom and terminating at point of discharge, cable means and pulley means disposed to establish a path of movement of a portion of said cable means along said surface and through said point of discharge, said pulley means including an end pulley mounted beyond the discharge end of said inclined flight, at least one scoop unit secured to said cable portion for movement along said flights, said scoop unit including opposite side plates having a runner portion and an arcuate rear rocking portion, a cross bar to which said cable portion is connected and extending between said side plates, and a transverse blade member disposed at an upward-rearward incline with respect to said runner portion, chain means connecting said transverse blade member to a point on said cable portion ahead of said scoop unit, chain means connecting each of said rocking portions to a point on said cable portion behind said scoop unit, return track means above said inclined flight and extending from a point adjacent said end pulley to invert and support said scoop unit along a path of movement paralleling said inclined flight, and power means for selectively operating said cable means in either direction along said flights and said track means.

References Cited in the file of this patent
UNITED STATES PATENTS

| | | |
|---|---|---|
| 1,243,136 | Broberg | Oct. 16, 1917 |
| 1,512,936 | Knapp | Oct. 28, 1924 |
| 2,516,798 | Peterson | July 25, 1950 |
| 2,552,743 | Simpson | May 15, 1951 |
| 2,577,082 | Hudson | Dec. 4, 1951 |
| 2,588,657 | Pitts | Mar. 11, 1952 |
| 2,752,029 | Hammond | June 26, 1956 |
| 2,867,046 | Baer | Jan. 6, 1959 |